(12) United States Patent
Cooke et al.

(10) Patent No.: US 9,250,410 B2
(45) Date of Patent: Feb. 2, 2016

(54) OPTICAL FIBER CABLE AND INTERCONNECT ASSEMBLY

(75) Inventors: Terry L. Cooke, Hickory, NC (US); Christopher S. Houser, Newton, NC (US); William C. Hurley, Hickory, NC (US); Samuel D. Navé, Newton, NC (US); James M. Wilson, Granite Falls, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 829 days.

(21) Appl. No.: 13/421,463

(22) Filed: Mar. 15, 2012

(65) Prior Publication Data

US 2013/0163932 A1    Jun. 27, 2013

Related U.S. Application Data

(60) Provisional application No. 61/578,985, filed on Dec. 22, 2011.

(51) Int. Cl.
*G02B 6/36* (2006.01)
*G02B 6/44* (2006.01)
*G02B 6/38* (2006.01)

(52) U.S. Cl.
CPC ............ *G02B 6/4472* (2013.01); *G02B 6/3885* (2013.01); *Y10T 29/49826* (2015.01); *Y10T 29/49863* (2015.01)

(58) Field of Classification Search
None
See application file for complete search history.

(56) References Cited

U.S. PATENT DOCUMENTS

| 4,822,134 | A | * | 4/1989 | Campbell | 385/109 |
| 5,155,789 | A | * | 10/1992 | Le Noane et al. | 385/106 |
| 6,701,047 | B1 | | 3/2004 | Rutterman et al. | 385/102 |
| 7,151,879 | B2 | | 12/2006 | Ishikawa et al. | |
| 7,186,031 | B2 | * | 3/2007 | Yang et al. | 385/53 |

(Continued)

FOREIGN PATENT DOCUMENTS

| CN | 201307177 Y | 9/2009 | G02B 6/44 |
| CN | 101592766 A | 12/2009 | G02B 6/44 |

(Continued)

OTHER PUBLICATIONS

Hurley, et al., "Bend-insensitive Multimode Fibers Enable Advanced Cable Performance," International Wire & Cable Symposium, Proceedings of the 58$^{th}$ IWCS/IICIT.

(Continued)

*Primary Examiner* — Tina Wong
(74) *Attorney, Agent, or Firm* — William D. Doyle

(57) ABSTRACT

An optical fiber cable includes a jacket and modules including optical fibers. The jacket has an interior that forms an elongate conduit between proximal and distal ends. The modules extend lengthwise through the conduit without being bound together in a pattern of twisting or wound together in a pattern of stranding. Also, the jacket and modules are sized such that free space is provided within the conduit between the modules and the jacket. The jacket is at least ten meters long, and the orientation, alignment, and size of the modules allow individual modules to slide lengthwise relative to one another through the conduit. Pulling one of the modules from the proximal end of the jacket while holding the other modules fixed at the distal end of the jacket draws the one module further into the jacket on the distal end of the jacket.

2 Claims, 8 Drawing Sheets

(56) References Cited

U.S. PATENT DOCUMENTS

| | | | |
|---|---|---|---|
| 7,609,926 B2 | 10/2009 | Rosenquist et al. | 385/109 |
| 7,738,759 B2 * | 6/2010 | Parikh et al. | 385/136 |
| 8,116,604 B2 * | 2/2012 | Bonicel et al. | 385/110 |
| 8,172,465 B2 * | 5/2012 | Kleeberger | 385/76 |
| 2008/0253723 A1 * | 10/2008 | Stokes et al. | 385/114 |

FOREIGN PATENT DOCUMENTS

| | | | | |
|---|---|---|---|---|
| CN | 101881867 A | 11/2010 | | G02B 6/44 |
| WO | WO2011/076279 A1 | 6/2011 | | G02B 6/44 |

OTHER PUBLICATIONS

I. P. Kaminov and T. L. Koch, Optical Fiber Telecommunications IIIA. New York: Academic, 1997, pp. 98-100.

K. Osato, Y. Hashimoto, N. Okada, "New Design of Optical Fiber Cable for Easy Mid-span Access," Proceedings of the 56th IWCS, 1997, pp. 225-229.

* cited by examiner

OPTICAL FIBER CABLE AND INTERCONNECT ASSEMBLY

RELATED APPLICATIONS

This application claims the benefit of priority under 35 U.S.C. §119 of U.S. Provisional Application No. 61/578,985, filed Dec. 22, 2011, the content of which is relied upon and incorporated by reference herein in its entirety.

BACKGROUND

Aspects of the present disclosure relate generally to optical fiber cables, interconnect assemblies including the optical fiber cables, and methods of manufacturing the interconnect assemblies.

Interconnect cable assemblies are typically used to connect servers and other hardware in data centers and other facilities. Due to industry trends of increasing speed, memory, and density of hardware in data centers, management and organization of correspondingly increasing numbers of optical fiber cables as well as complexity of the associated interconnections becomes more and more of an issue. Accordingly interconnect cable assemblies have been developed to help control and organize the optical fiber cables and interconnections in a data center. One such development includes harness cable assemblies.

A harness cable assembly is a particular type of interconnect cable assembly where one end of the harness cable assembly includes a multi-fiber connector that supports optical fibers extending through the harness cable assembly to the other end, which includes furcated legs each having local connectors that support subsets of the optical fibers. A jacket holds discrete subsets of the optical fibers together in modules so that the optical fibers may be efficiently routed together through the data center. Routing the cables together helps to minimize the volume of space used by the optical fiber cables and correspondingly helps to organize densely populated data centers and other facilities. However, conventional manufacturing of harness cable assemblies is a time-consuming and resource-intensive process, which may suffer from low process yields.

Conventionally to manufacture a harness cable assembly, manufacturers first select a length of optical fiber cable. The cable typically includes a jacket surrounding buffer tubes that each include optical fibers. Within the jacket, the buffer tubes are tightly packed together to allow for a minimal jacket diameter, saving space and material costs. The buffer tubes of optical fiber cables are typically stranded. The manufacturers attach local connectors to the optical fibers of the buffer tubes, typically removing about three to seven meters (e.g., ten to twenty feet) of the cable jacket and feeding the optical fibers through an empty furcation tube. However, this approach only allows for a limited length of the harness assembly. In some such cases, the maximum length allowed by this method is about eight meters (e.g., twenty-five feet), because beyond about eight meters, friction generated by pushing the optical fibers through the furcation tube may break the fibers. Furthermore, the lengths of the furcated legs are not adjustable or customizable with the conventional method once local connectors are attached to the legs—thus ruining desired configurations of the legs, such as a precise staggering formations, if a local connector on any of the legs needs to be reworked (e.g., replaced, reattached, etc.) during manufacturing.

Accordingly, a need exists for an interconnect optical fiber cable assembly structure or manufacturing method that allows for longer cable assembly lengths. A need exists for an interconnect optical fiber cable assembly structure or manufacturing method that allows for adjustment of the leg lengths once local connectors are attached to the legs, if a local connector on any of the legs needs to be reworked during manufacturing. A need exists for an interconnect optical fiber cable assembly structure or manufacturing method that reduces time and manufacturing costs of producing the interconnect optical fiber cable, and thereby increasing process yields.

SUMMARY

One embodiment relates to an optical fiber cable, which includes a jacket and modules including optical fibers. The jacket has an interior that forms an elongate conduit between proximal and distal ends of the jacket. The modules extend lengthwise through the conduit of the jacket without being bound together in a pattern of twisting or wound together in a pattern of stranding. Some twisting or winding may be present in such embodiments, but the twisting or winding is not actively provided or in an organized pattern. Also, the jacket and modules are sized such that free space (e.g., maneuvering room) is provided within the conduit between the modules and the interior of the jacket. The jacket is at least ten meters long, and the orientation, alignment, and size of the modules relative to the conduit and to one another allow individual modules to slide lengthwise relative to one another through the conduit without breaking the optical fibers of the respective modules. Put another way, pulling one of the modules from the proximal end of the jacket while holding the other modules fixed at the distal end of the jacket draws the one module further into the jacket on the distal end of the jacket. In other such embodiments, the jacket is at least five meters long, at least twenty-five feet long, at least fifty feet long, etc., and in some embodiments is less than two-hundred meters long, such as less than one-hundred meters long. As such, the jacket may be sized to manufacture a harness cable assembly of about at least such a length, while still allowing lengthwise sliding of the individual modules relative to one another during the manufacturing, such as to adjust the length of associated furcated legs of the harness cable assembly.

Another embodiment relates to a method of manufacturing an optical fiber cable assembly. The method includes a step of attaching local connectors to optical fibers of legs of the optical fiber cable assembly. The legs are formed from distal portions of modules that project from a distal end of a jacket of the optical fiber cable assembly. The method further includes a step of sliding the modules axially through the jacket relative to one another in order to change the length of the corresponding legs, thereby adjusting the length of the legs for a desired configuration of the optical fiber cable assembly, such as a staggered leg configuration of a harness cable assembly.

Yet another embodiment relates to an optical fiber cable assembly, such as a harness cable assembly, which includes a jacket, a strength element, modules including optical fibers, a furcation body, local connectors, and a multi-fiber connector. The jacket has an interior that forms an elongate conduit between proximal and distal ends of the jacket. The strength element extends through the jacket between the proximal and distal ends. The modules are longer than the jacket and distal ends of the modules project outward from the distal end of the jacket forming separate legs of the optical fiber cable assembly, but proximal ends of the modules are aligned with the proximal end of the jacket. Portions of the modules extend together through the conduit, from the proximal end to the distal end, without stranding—meaning that the modules are not actively stranded in a repeating pattern, as occurs with helical or "S-Z" stranding—and are configured to slide lengthwise relative to one another through the conduit, allowing for adjustment of the length of the legs during manufacturing of the optical fiber cable assembly. The legs formed by the modules are coupled to the distal end of the jacket via the furcation body and the local connectors are attached to the optical fibers of the modules at distal ends of the legs formed by the respective modules. The multi-fiber connector is attached to the optical fibers of the modules at the proximal end of the jacket. In other such embodiments, single-fiber connectors are attached to the optical fibers on the proximal end of the jacket, instead of the multi-fiber connector(s).

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
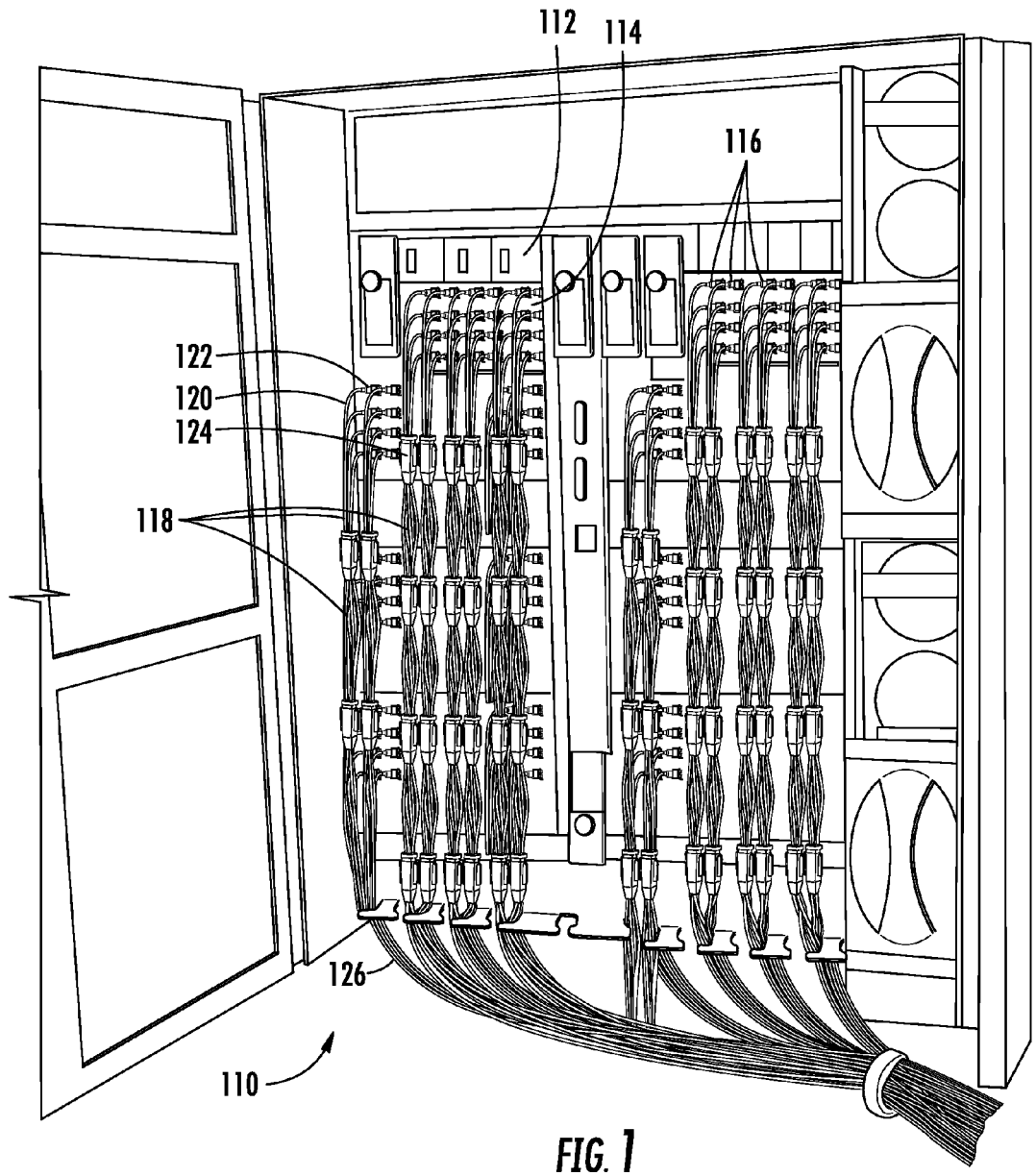
FIG. 1 is a front perspective view of optical fiber routing of a high-density housing.
Figure 2:
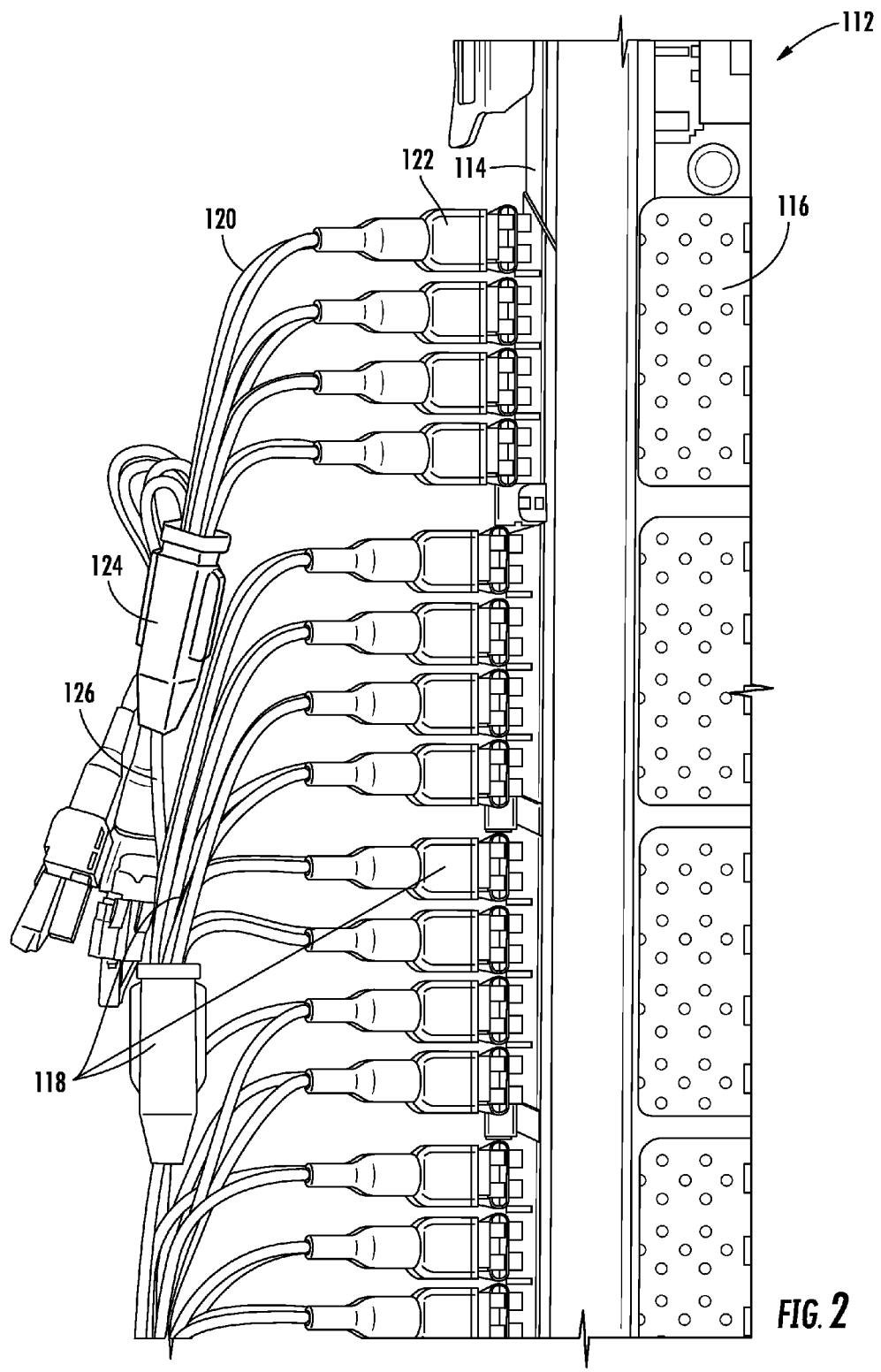
FIG. 2 is a side perspective view of harness cable assemblies connected to a blade server of the housing of FIG. 1.
Figure 3:
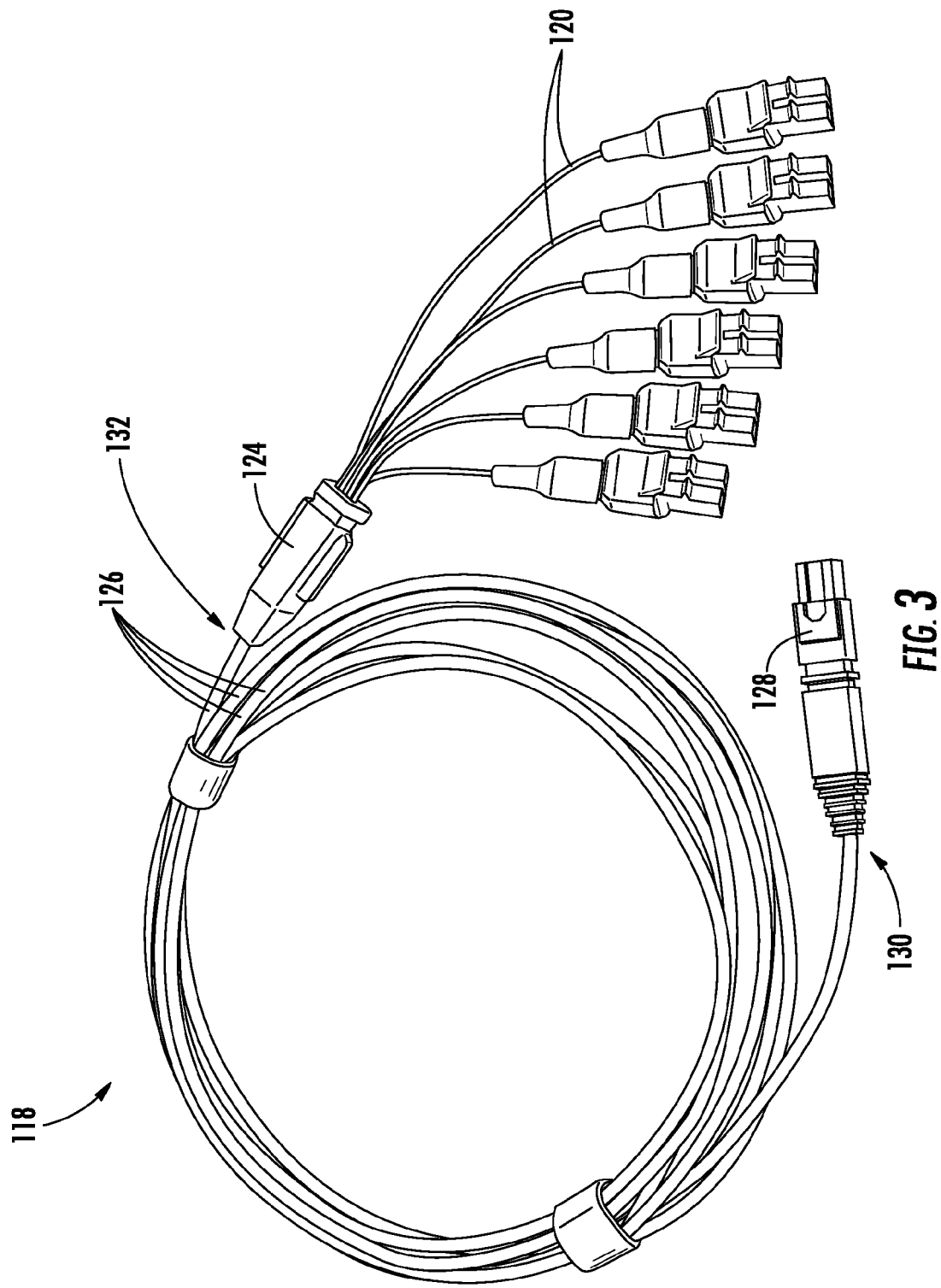
FIG. 3 is a perspective view of a harness cable assembly.

Referring to FIGS. 1-3, a data center or other facility includes a cabinet 110 of computerized hardware 112 (e.g., equipment rack). The hardware 112 includes a connector panel 114 having servers 116, such as vertically-arranged blade servers or other servers. Interconnect optical fiber cable assemblies 118 are connected to the servers 116 with local connectors 122 (e.g., duplex LC connectors, LC-style uni-boot connectors) attached to furcated legs 120 of the interconnect optical fiber cable assemblies 118. The furcated legs 120 are formed from modules, such as buffer tubes including optical fibers or cable ribbons including optical fibers, that extend from furcation bodies 124 (i.e., structure associated with a furcation point; e.g., furcation plugs, module-separating devices, heat-shrink furcation, molded-in-place furcation body, where the furcation body is injection molded similar to molded connector boots), which may be clipped together or stacked to keep the cabinet 110 well organized and to maintain sufficient space in the cabinet 110 for cooling airflow to reach the servers 116.

Figure 5:
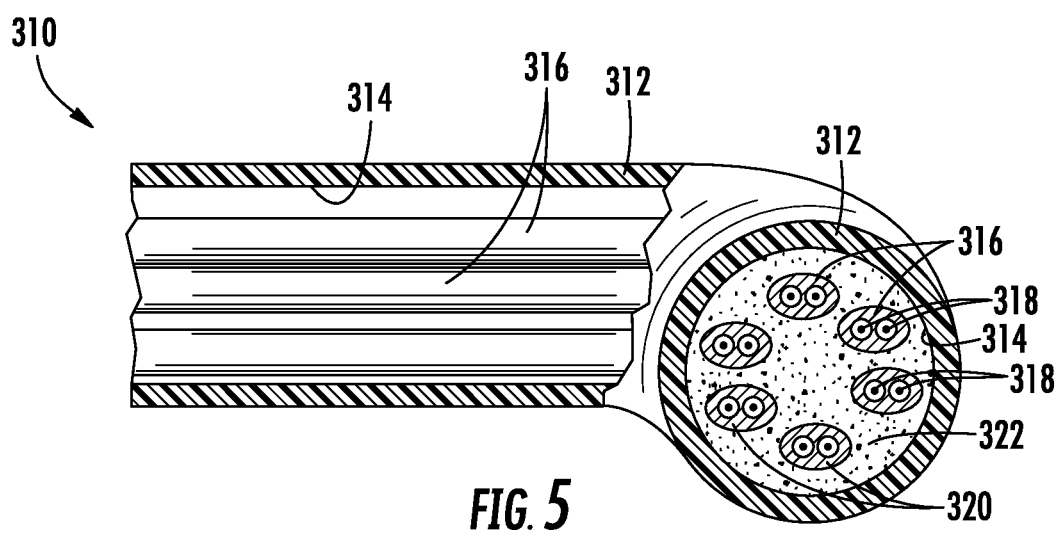
FIG. 5 is a cut-away and sectional view of a section of an optical fiber cable according to an exemplary embodiment.

The furcation bodies 124 are attached to jackets 126 (e.g., tube, trunk) of the interconnect optical fiber cable assemblies 118, which the modules extend through (i.e., into and along a conduit formed by the interior of the jacket 126; see, e.g., modules 316 extending through jacket 312 as shown in FIG. 5). From the furcation bodies 124, the modules extend together (e.g., are generally parallel with one another; are lengthwise aligned with one another) through the jacket 126 to another part of the hardware, another area of the data center, or elsewhere. In some embodiments, the modules are received by a multi-cable connector 128 (FIG. 3) on the far end of the jacket 126, such as a multiple-fibre push-on/pull-off (MPO) connector configured for twelve fibers, a twelve-fiber MPT connector, or connector(s) associated with a 144-fiber trunk cable.

Figure 4:
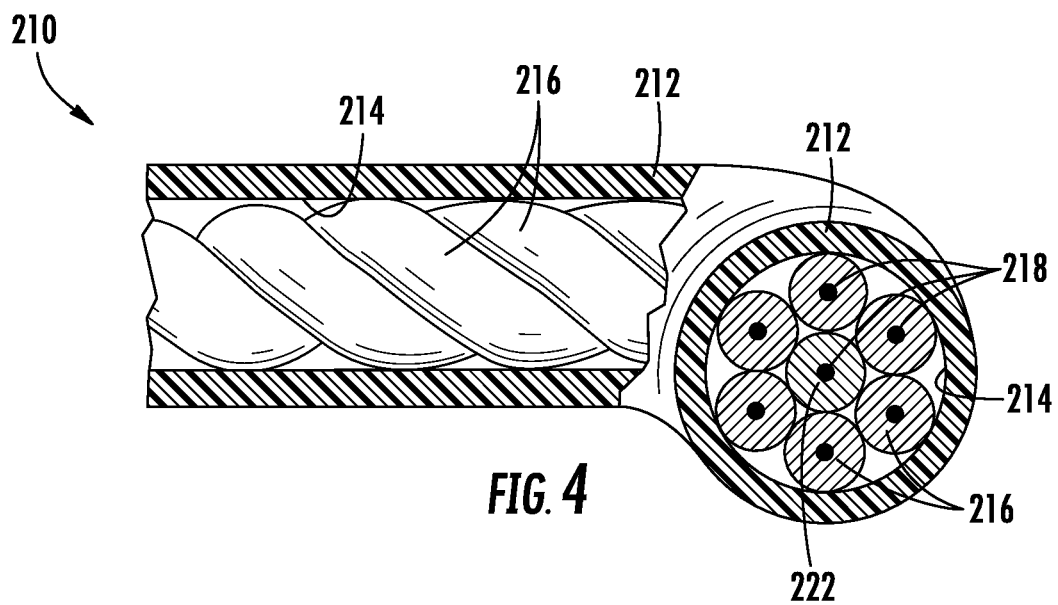
FIG. 4 is a cut-away and sectional view of a section of an optical fiber cable.
Figure 6:
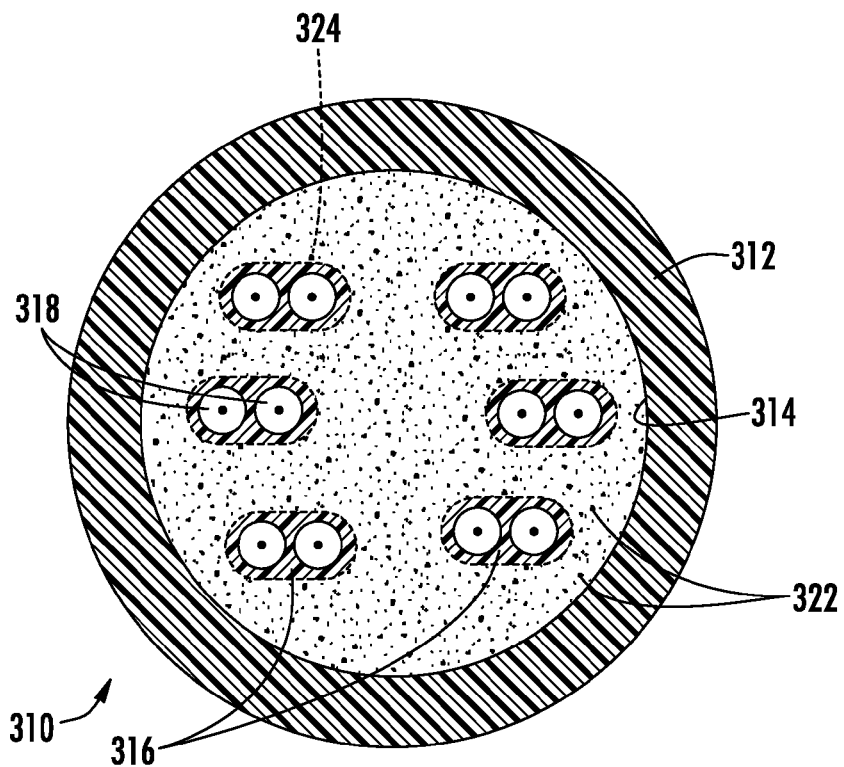
FIG. 6 is a sectional view of the optical fiber cable of FIG. 5.

Referring to FIGS. 4-6, optical fiber cables 210 (FIG. 4), 310 (FIGS. 5-6) each include a jacket 212, 312 having an interior that forms an elongate conduit 214, 314 between proximal and distal ends of the jacket 212, 312 (see, e.g., proximal end 130 and distal end 132 of jacket 126 as shown in FIG. 3). The conduit 214, 314 of each jacket 212, 312 contains modules 216, 316 extending lengthwise through the conduit 214, 314 (e.g., two or more modules 216, 316, six individual modules 216, 316, etc.), where the modules 216, 316 include optical fibers 218, 318. In contemplated embodiments, the modules 216, 316 each include (e.g., support, contain, comprise, consist of, consist essentially of) only a single tight-buffered optical fiber, while in other embodiments the modules 216, 316 each include multiple optical fibers, such as two-fiber modules, four-fiber modules, twenty-four-fiber modules, etc. The modules 216, 316 may include buffer tubes 220 loosely containing the optical fibers 218, single tight-buffered fibers, ribbons 316 of optical fibers 318 where the optical fibers 318 are aligned side-by-side with one another and bound together with resin matrix to form the ribbons 316, stacks of such ribbons 316 in buffer tubes, or other arrangements and configurations.

Referring specifically to FIG. 4, the optical fiber cable 210 generally includes a conventional configuration where the modules 216, in the form of the buffer tubes 220 loosely containing the optical fibers 218, are wound together in an organized pattern (e.g., stranded together, helically stranded, "S-Z" stranded) about a central strength element 222, such as a rod of glass-reinforced plastic. While the optical fibers 218 of the modules 216 in FIG. 4 are loosely contained in the buffer tubes 220, in other configurations ribbons of optical fibers may be contained in the buffer tubes 220, or stacks of such ribbons may be contained in the buffer tubes 220, where the stacks of ribbons are twisted together within the buffer tubes 220. Buffer tubes in cables are typically stranded because stranding of the buffer tubes 220 densely packages the modules 216, while allowing the modules 216 to bend with the optical fiber cable 210, without overstressing the modules 216 and associated optical fibers 218. Furthermore, densely packaging the modules 216 allows the jacket 212 to be narrower, reducing costs in cable materials and resulting in products that take up less space. However, twisting and stranding of the modules 216 may generally limit the ability to move individual modules 216 axially through the optical fiber cable 210 due to friction between the modules 216 and other modules 216, the strength element 222, and the interior of the jacket 212.

Turning now to FIGS. 5-6, the optical fiber cable 310 includes the modules 316 extending through the jacket 312 in a configuration where the modules 316 are not stranded and are not densely packaged in the jacket 312. Put another way, the modules 316 are arranged in the jacket 312 without being bound together in a pattern of twisting or wound together in a pattern of stranding. According to an exemplary embodiment, the jacket 312 of the optical fiber cable 310 is at least about ten meters in length from proximal to distal ends (e.g., at least fifteen, twenty, twenty-five, or thirty meters long; at least fifty feet long), and the modules 316 are not fixed to the jacket 312, a strength element 322, or to one another due to friction, and may instead slide freely from or into the ends of the jacket 312 and through the jacket 312 as individual modules 316, without necessarily displacing the other modules 316.

According to an exemplary embodiment, the jacket 312 and modules 316 are sized such that sufficient space is provided within the conduit 314 formed by the jacket 312, between the modules 316 and the interior of the jacket 312, to allow the modules 316 to slide lengthwise relative to one another through the conduit 314 without breaking the optical fibers 318 of the respective modules 316 during use of the optical fiber cable 310 for manufacturing of an interconnect optical fiber cable assembly, such as a harness assembly (see, e.g., interconnect optical fiber cable assemblies 118 shown in FIGS. 1-3). Accordingly, pulling one of the modules 316 from the proximal end of the jacket 312 while holding the other modules 316 fixed at the distal end of the jacket 312 draws the one module 316 further into the jacket 312 on the distal end of the jacket 312 without breaking the optical fibers 318. In some such embodiments, with the optical fiber cable 310 at least ten meters long (laying straight), pulling one of the modules 316 with a force of less than about 200 newtons (e.g., less than fifty pounds of force; less than 100 newtons) from the proximal end of the jacket 312 while holding the other modules 316 fixed at the distal end of the jacket 312 draws the one module 316 further into the jacket 312 on the distal end of the jacket 312 without plastically deforming or fracturing the one module 316, including the optical fiber(s) contained in the one module 316 (e.g., polypropylene buffer tube with one millimeter inner diameter including filling gel and optical fibers coated to 250 microns). Similarly, modules 316, including the optical fibers, may be pulled through the jacket 312 from the distal end. The optical fiber cable 310 may be cut from a longer cable for manufacturing a single harness assembly, and may be less than one-hundred meters long, such as less than fifty meters long; but may also be at least ten meters long, such as at least twenty meters long.

In some embodiments, the modules 316 are generally aligned longitudinally with the jacket 312 (see generally the arrangement shown in the broken-away section of the optical fiber cable 310 of FIG. 5). Orienting the modules 316 in a generally-straight configuration, without winding or twisting the modules 316 together or about a common member (e.g., without actively stranding, intentionally stranding, or stranding in a repeating pattern), may reduce friction between the modules 316 and other modules 316 as well as between the modules 316 and the jacket 312 or strength element 322, allowing individual modules 316 to slide through the jacket 312 relative to the other modules 316 despite the length of the jacket 312. Excess length of the modules 316 exceeding the length of the jacket 312 (or the strength element 322) may result in some bending of the modules 316 within the jacket 312, away from the lengthwise axis of the jacket 312; however, in some such embodiments, the modules 316 extend in generally straight, parallel lines with respect to one another when the jacket 312 is straight, such that for a given section of the optical fiber cable 310, the fully outstretched modules 316 are less than ten percent longer than the jacket 312 or the strength element 322 (e.g., less than five percent, about the same length).

In some embodiments, the inner diameter of the jacket 312 is sized to provide free space within the conduit 314 of the jacket 312, even with the modules 316 extending through the jacket 312. Sizing the jacket 312 to have a cross-section significantly greater than the combined cross-sectional areas of the modules 316 (and strength element 322) may be counterintuitive for optical fiber cable designer because the jacket 312 may therefore include more material and be wider than the jacket 312 would otherwise need to be in order to effectively contain the modules 316, or even to allow lateral movement of the modules 316 within the jacket 312 as some cables may allow. However, the amount of free space in the optical fiber cable 310 is specifically intended to reduce friction as individual modules 316 are moved axially (i.e., lengthwise, longitudinally) through the jacket 312. For example, in some embodiments, the combined cross-sectional area of all the modules 316 is significantly less than half of the cross-sectional area of the conduit 312 formed by the interior of the jacket 312, such as about 40-percent or less. However, in other embodiments, such as where lubricants are used or where the length of the jacket is shorter, the ratio may be greater than half.

An additional advantage of sizing the jacket 312 to achieve sufficient free space for axial sliding of the modules 316 is that the free space may also allow the modules 316 to slide laterally around one another (i.e., widthwise, latitudinally, in the plane orthogonal to the longitudinal axis of the modules 316). As such, if the optical fiber cable 310 bends, the cross-sectional geometry of the optical fiber cable 310 may flatten and become oblong. The free space provided by the sizing of the jacket 312 relative to the modules 316 may allow the modules 316 to reposition themselves closer to the central axis of the bend in a configuration corresponding to less tension or compression of the modules 316 and associated optical fibers 318. However for optical fiber cables 310 of at least ten meters in length, freedom of axial movement of the modules 316 may require a greater amount of free space than is required merely for freedom of lateral movement of the modules 316 (i.e., freedom of axial movement of the modules 316 and freedom of lateral movement of the modules 316 are different attributes, such that freedom of axial movement of the modules 316 is not inherent in optical fiber cables configured to allow for freedom of lateral movement, and vice versa).

Figure 7:
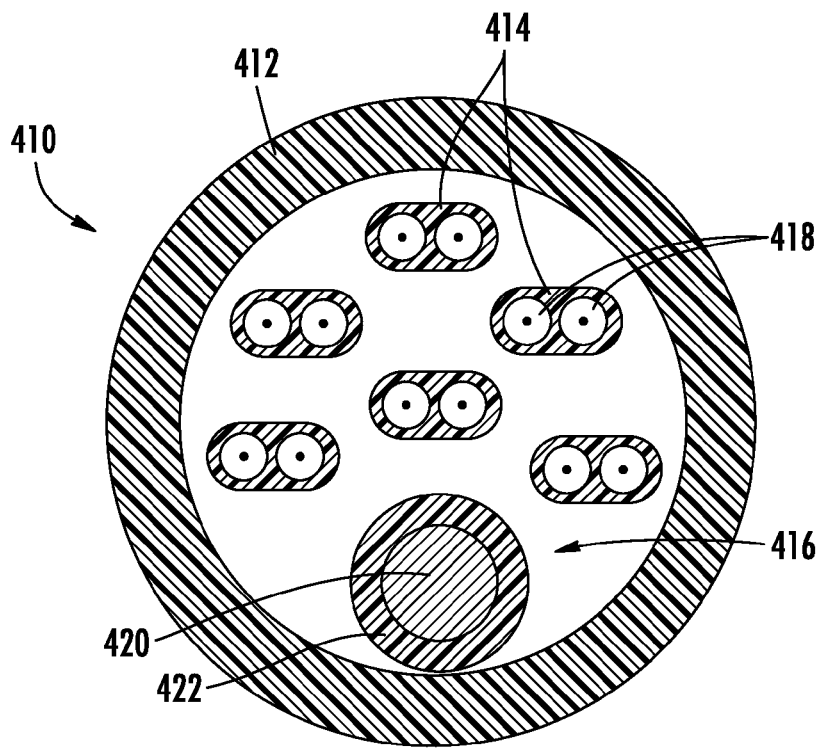
FIG. 7 is a sectional view of an optical fiber cable according to another exemplary embodiment.

According to an exemplary embodiment, the modules 316 of the optical fiber cable 310 include (e.g., support, contain, comprise, consist of, consist essentially of) ribbons of optical fibers, where the optical fibers 318 are aligned side-by-side with one another and bound together with a matrix 320 (e.g., ultra-violet light curable resin, epoxy) to form the ribbons. In some embodiments, the modules 316 include two-fiber ribbons as shown in FIGS. 5-7, which are well suited for local connectors of harness cable assemblies (see generally FIGS. 1-3) or other assemblies. In other embodiments, three-fiber ribbons, six-fiber ribbons, twelve-fiber ribbons, multi-fiber ribbons, and ribbons of other fiber counts may be used.

According to an exemplary embodiment, each module 316 of the optical fiber cable 310 consists entirely of a ribbon of optical fibers 318, such as a two-fiber ribbon as shown in FIGS. 5-7. Buffer tubes, casings, and other support structures for the individual modules may be superfluous in some such embodiments and are not included. Modules 316 consisting solely of ribbons of optical fibers 318 (as compared with buffer tubes 220 shown in FIG. 4, for example), allow for faster connectorization of the optical fibers 318 of the modules 316, saving costs and time associated with manufacturing interconnect optical fiber cable assemblies using the optical fiber cable 310. Furthermore, in some embodiments, use of the modules 316, in the form of ribbons, allows for a narrower jacket 312 cross-section while still maintaining the ratios of free space sufficient to allow for axial sliding of individual modules 316 relative to the other modules 316 and the jacket 312, without breaking the optical fibers 318 of the modules 316. Additionally, use of two-fiber ribbons for the modules 316, where the ribbons are not twisted or stranded together, decreases the bending moment experienced by the outermost edges of the ribbons on the wider cross-sectional axis when compared to wider ribbons containing more fibers. However, in other embodiments modules may include ribbons of optical fibers that extend within buffer tubes, include more than two optical fibers, or are twisted and stacked within the buffer tubes.

In some embodiments, two-fiber ribbons are used for the modules 316 of the optical fiber cable 310, where the ribbons are selected with optical fibers 318 that are color coded (i.e., include an ink or dye layer) such that the optical fiber cable 310 and any optical fiber cable assembly using the optical fiber cable 310 includes more than two different colors of the optical fibers 318. Use of different color-coded optical fibers 318 allows for more efficient connectorization of the optical fibers 318 by helping to identify the individual optical fibers 318, such as when connecting the optical fibers 318 to a multi-fiber connector (see, e.g., multi-fiber connector 128 as shown in FIG. 3). In some such embodiments, at least twelve differently color-coded optical fibers 318 are included.

According to an exemplary embodiment, the optical fiber cable 310 further includes a lubricant that is interior to the jacket 312 and exterior to the modules 316. In some embodiments, the lubricant includes a powder impregnated in the strength element 322. In other embodiments, the lubricant includes a coating 324 (FIG. 6) extruded on the exterior of the modules 316, such as a polytetrafluoroethylene coating (PTFE, "Teflon"), or on the interior of the jacket 312. In another embodiment, the matrix material of the ribbons may contain a lubricant such as silicone. Use of the lubricant lowers the coefficient of friction between the modules 316 and surrounding structure, allowing the jacket 312 to be narrower or longer while maintaining the ability to slide one of the modules 316 axially through the jacket 312 without damaging the optical fibers 318.

According to an exemplary embodiment, the optical fiber cable 310 includes the strength element 322, which is in the form of loose yarns (e.g., aramid, fiber glass), where the strength element 322 extends through the conduit 314 of the jacket 312 to reinforce the jacket 312 and modules 316 when tensile loading is experienced. The yarns of the strength element 322 are generally aligned with the modules 316 and fill only a small portion of the free space provided between the modules 316 and the interior of the jacket 312, such as taking up less than twenty percent of the free space.

Referring now to FIG. 7, an optical fiber cable 410 includes a jacket 412 and modules 414, similar to the optical fiber cable 310 of FIG. 5-6 and similarly having above-described structures and features that provide the ability of the modules 414 of the optical fiber cable 410 to axially slide lengthwise through the jacket 412, individually without damaging optical fibers 418 of the optical fiber cable 410. However, unlike the optical fiber cable 310 of FIGS. 5-6, the optical fiber cable 410 includes a strength element 416 that includes yarns (e.g., aramid, fiber glass) arranged in a discrete bundle 420. In some embodiments, the bundle 420 is overcoated with a matrix 422 of plastic, epoxy, resin, or another matrix material such that the overcoat discretely contains the yarns, separating the yarns from the modules 414. In other embodiments, the bundle 420 is overcoated and fully infused with a matrix material holding the yarns together.

Discretely partitioning the strength element 416 in a bundle 420 is intended to prevent tangling of the strength element 416 and the modules 414 and to reduce the surface-contact interface between the strength element 416 and the modules 414, reducing friction between the modules 414 and the strength element 416 when axially sliding the modules 414 through the jacket 412 relative to the strength element 416. Additionally, partitioning the strength element 416 in a discrete bundle 420 may also aid attachment and handling of the strength element 416, such as when fastening the strength element 416 to a connector or furcation body (see, e.g., multi-fiber connector 128 and furcation body 124 as shown in FIG. 3), or otherwise anchoring the strength element 416.

Figure 8:
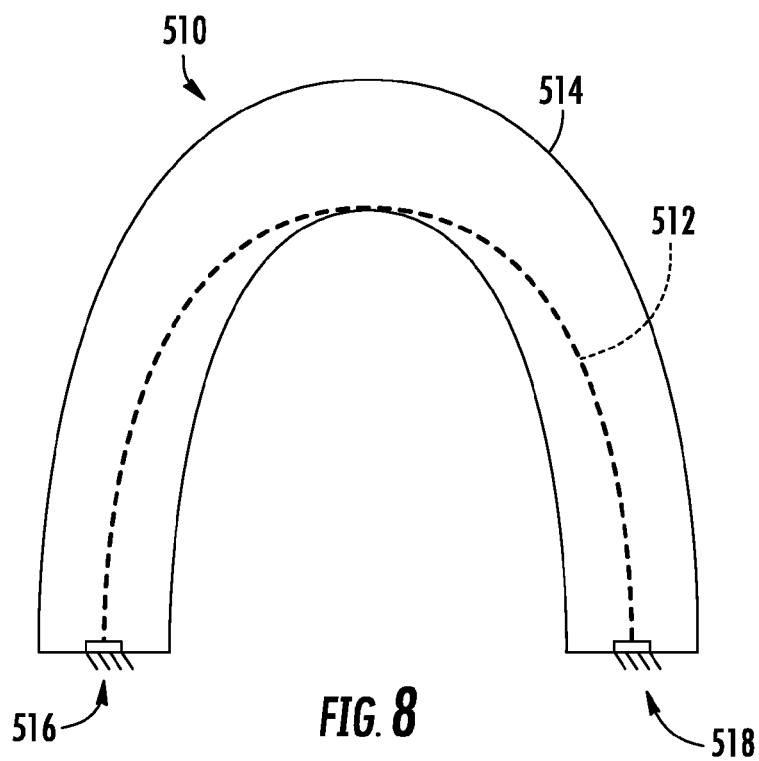
FIG. 8 is a schematic view of strength element of an optical fiber cable in a first configuration.
Figure 9:
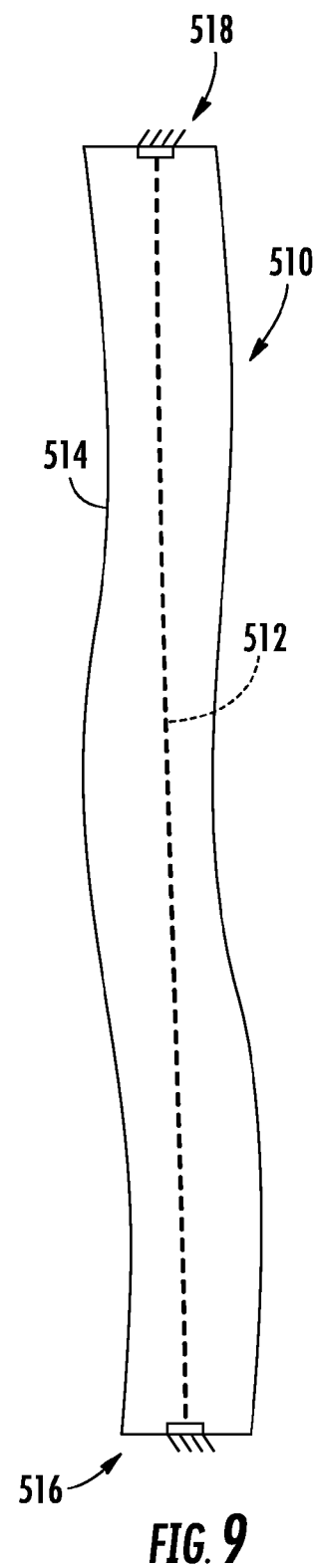
FIG. 9 is a schematic view of the strength element of FIG. 8 with the optical fiber cable in a second configuration.

Referring now to FIGS. 8-9, a strength element 512 of an optical fiber cable assembly 510, such as the strength element 416 of FIG. 7, is fixed at the proximal and distal ends 516, 518 of a jacket 514, such as the jacket 412 of FIG. 7. The strength element 512 is attached (e.g., connected, fixed) such that tensile loads experienced by the optical fiber cable assembly 510 along the jacket 514 are primarily borne by the strength element 512. According to an exemplary embodiment, the unstretched length of the strength element 512 between the proximal and distal ends 516, 518 of the jacket 514 is shorter than the jacket 514 or the portions of modules (see, e.g., modules 414 as shown in FIG. 7) extending through the jacket 514 between the proximal and distal ends 516, 518. As such, when the jacket 514 is stretched in tension (FIG. 9), the strength element 512 is tensioned before the modules are tensioned.

Figure 10:
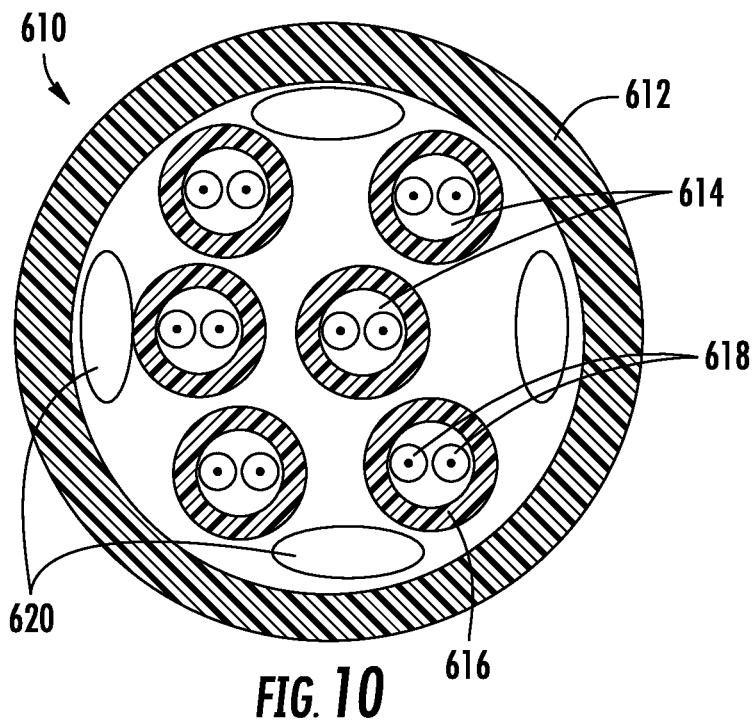
FIG. 10 is a sectional view of an optical fiber cable according to yet another exemplary embodiment.
Figure 11:
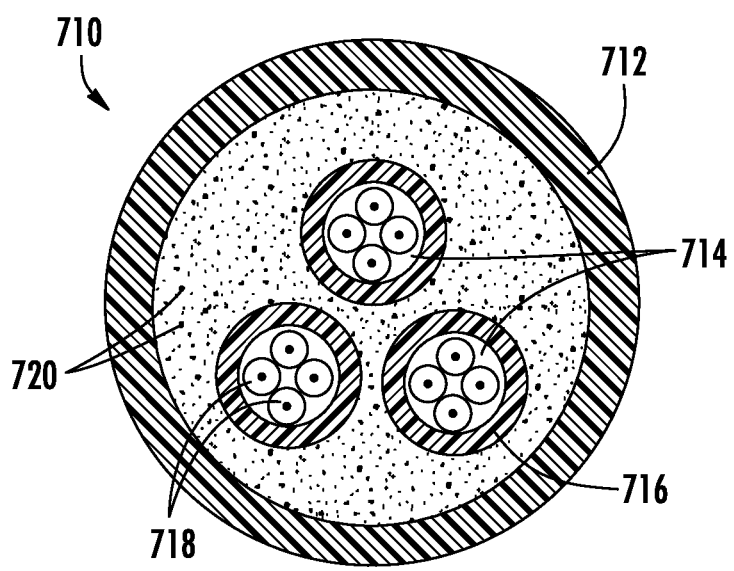
FIG. 11 is a sectional view of an optical fiber cable according to still another exemplary embodiment.

Referring to FIGS. 10-11, optical fiber cables 610, 710 each include a jacket 612, 712 and modules 614, 714, similar to the optical fiber cables 310, 410 of FIG. 5-7 and similarly having above-described structures and features that provide the modules 614, 714 the ability to axially slide lengthwise through the jackets 612, 712 of optical fiber cables 610, 710, individually without damaging associated optical fibers 618, 718 of the optical fiber cables 610, 710. However, unlike the optical fiber cables 310, 410 of FIGS. 5-7, the modules 614, 714 of the optical fiber cables 610, 710 include buffer tubes 616, 716 that loosely contain the optical fibers 618, 718.

Still referring to FIGS. 10-11, the buffer tubes 616 of the optical fiber cable 610 of FIG. 10 include two optical fibers 618 per buffer tube 616, while the buffer tubes 716 of the optical fiber cable 710 of FIG. 11 include four optical fibers 718 per buffer tube 716. Additionally, the optical fiber cable 610 of FIG. 10 includes a strength element 620 including bundles of reinforcement yarns or discrete rods (e.g., over-coated aramid, glass-reinforced plastic), while the optical fiber cable 710 of FIG. 11 includes a strength element 720 that includes yarns loosely extending through free space interior to the jacket 712 and exterior to the buffer tubes 716. Either arrangement may be used for manufacturing interconnect optical fiber cable assemblies (see, e.g., interconnect optical fiber cable assemblies 118 as shown in FIG. 1-3), however the configuration of FIG. 11 may allow for a narrower jacket 712, while the configuration of FIG. 10 may allow for faster connectorization to duplex LC connectors.

According to an exemplary embodiment, the diameter of the buffer tubes 616 shown in FIG. 10 may be less than about 1 mm, such as about 0.9 mm, while the diameter (e.g., inner diameter) of the jacket 612 may be at least four times that of the buffer tubes 616, such as about 4 mm. By way of comparison, in some embodiments the jacket 412 of the optical fiber cable 410 shown in FIG. 7 may be about 3.0 to 3.6 mm in diameter (e.g., inner diameter) and the two-fiber ribbons may be considerably smaller than the buffer tubes 616 such that the ratio of free space to area of the optical fiber cable 410 is greater than the ratio of free space to area of the optical fiber cable 610.

The optical fiber cables 310, 410, 610, 710 of FIGS. 5-7 and 10-11 may be particularly well suited for use manufacturing interconnect optical fiber cable assemblies, such as the interconnect optical fiber cable assemblies 118 shown in FIGS. 1-3, at least in part because the optical fiber cables 310, 410, 610, 710 allow for axial sliding of the individual modules 316, 414, 614, 714 through relatively long jackets 312, 412, 612, 712 of the respective optical fiber cables 310, 410, 610, 710, which may be useful for adjusting and controlling the lengths of furcated legs (see, e.g., legs 120 as shown in FIG. 1) of the interconnect optical fiber cable assemblies during manufacturing.

Figure 12:
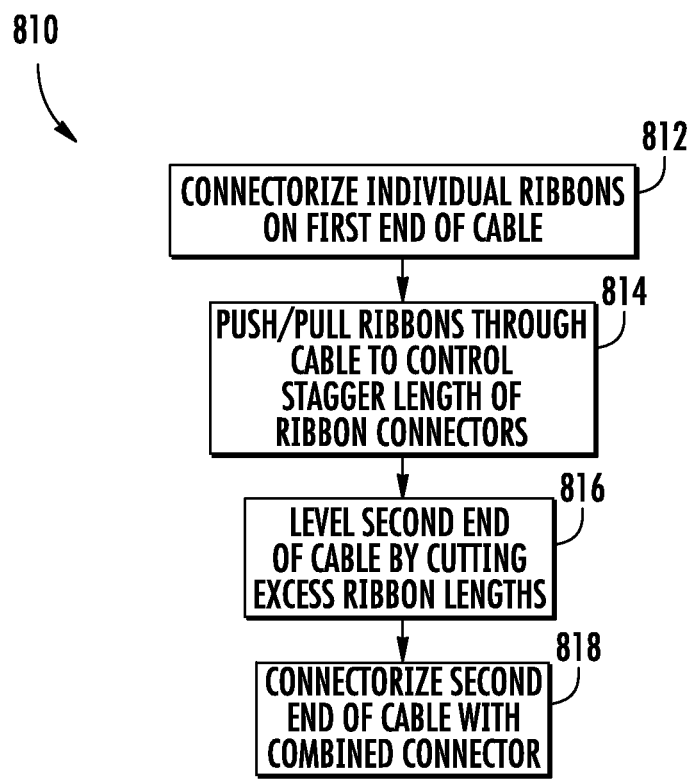
FIG. 12 is a flow diagram of a method of manufacturing an optical fiber cable harness assembly according to an exemplary embodiment.

Referring now to FIGS. 3 and 12, a method 810 of manufacturing an optical fiber cable assembly 118 includes a step 812 of attaching local connectors 122 to optical fibers of legs 120 of the optical fiber cable assembly 118, where the legs 120 are formed from distal portions of modules (see, e.g., modules 316, 414, 614, 714 as shown in FIGS. FIGS. 5-7 and 10-11) that project from a distal end 132 of the jacket 126 (see also jackets 312, 412, 612, 712 as shown in FIGS. FIGS. 5-7 and 10-11) of the optical fiber cable assembly 118. The method further includes a step 814 sliding the modules axially through the jacket 126 relative to one another in order to change the length of the corresponding legs 120. The lengths of the legs 120 are adjusted for a desired configuration of the optical fiber cable assembly 118.

For example, in one desired configuration the legs 120 are staggered with the longest leg 120 on one side of the furcation body 124, and the rest of the legs 120 decreasing in length with distance from the longest leg 120 such that the local connectors 122 are each separated from the furcation body 124 by a leg 120 of a different length. Such a staggered configuration may be useful with vertical blade servers 116, as generally shown in FIG. 2, for avoiding excess cable slack where the furcation body 124 may hang below the lowest local connector 122 and the lower legs 120 would otherwise be too long. In other embodiments, different sets of leg lengths may be advantageous, such as a configuration where the outermost legs 120 are longer than the innermost legs 120.

According to an exemplary embodiment, the method 810 of manufacturing the optical fiber cable assembly 118 further includes steps 816 of severing and removing excess length of the modules projecting from the proximal end 130 of the jacket 126 and aligning proximal ends of the modules with the proximal end 130 of the jacket 126. In some such embodiments the method 810 includes an additional step 818 of then attaching a multi-fiber connector 128 to optical fibers of the modules at the proximal end 130 of the jacket 126, forming a harness cable assembly.

According to an exemplary embodiment, the method of manufacturing 810 may also include steps of tensioning a strength element extending through the jacket (see, e.g., strength element 512 and jacket 514 as shown in FIGS. 8-9) and fixing the strength element at the proximal and distal ends of the jacket (see, e.g., proximal and distal ends 516, 518 as shown in FIGS. 8-9), while not correspondingly tensioning the modules. Accordingly, when the jacket 126 is subsequently stretched, the strength element is tensioned before the modules are tensioned, and tensile loads experienced by the optical fiber cable assembly 118 along the jacket 126 are primarily borne by the strength element. One method of tensioning the strength element includes pulling slack from the strength element while the jacket is curved (see generally FIG. 8; e.g., folded, coiled), and then fixing the strength element at ends of the jacket, such as by attaching the multi-fiber connector 128 to the strength element on one end 130 of the jacket 126 and the furcation body 124 to the strength element on the other end 132 of the jacket 126.

Referring now to FIGS. 3, 7, and 12, an optical fiber cable assembly as shown in FIG. 3 may be manufactured according to the method of FIG. 12 using the optical fiber cable of FIG. 7. According to such an embodiment, the optical fiber cable assembly 118 includes the jacket 126 having an interior (see FIG. 7) that forms the elongate conduit between proximal and distal ends 130, 132 of the jacket 126, a strength element 416 extending through the jacket 126 between the proximal and distal ends 130, 132, and modules 414 including optical fibers 418. During manufacturing of the optical fiber cable assembly 118, a portion of the jacket 126 of the optical fiber cable 410 is removed, such that the modules 414 are then longer than the jacket 126 and distal ends of the modules 414 project outward from the distal end 132 of the jacket 126 forming separate legs 120 of the optical fiber cable assembly 118, while proximal ends of the modules 414 are aligned with the proximal end 130 of the jacket 126. The modules 414 extend together through the conduit, from the proximal end 130 to the distal end 132, without stranding of the modules 414 together (see, e.g., modules 316 as shown in FIG. 5).

Furthermore, according to such an embodiment, the optical fiber cable assembly 118 additionally includes a furcation body 124, local connectors 122, and a multi-fiber connector 128. The legs 120 formed by the modules 414 are coupled to the distal end 132 of the jacket 126 via the furcation body 124. The local connectors 122 are attached to the optical fibers 418 of the modules 414 at distal ends of the legs 120 formed by the respective modules 414, and the multi-fiber connector 128 is attached to the optical fibers 418 of the modules 414 at the proximal end 130 of the jacket 126. In some such embodiments, the strength element 416 is fixed to the multi-fiber connector 128 at the proximal end 130 of the jacket 126 and to the furcation body 124 at the distal end 132 of the jacket 126, such as by adhesion, friction fit, spot welding, etc.

In various contemplated embodiments, the materials of the optical fiber cable assembly 118 may include those common in the industry to enable the optical fiber cable assembly 118 to achieve riser, plenum, or low smoke zero halogen (LSZH) burn listings. The number of buffer tubes (see, e.g., buffer tubes 616, 716 as shown in FIGS. 10-11) or ribbons (see, e.g., ribbons of modules 316, 414 of FIGS. 5-7) in an optical fiber cable 118 may be changed to match a particular harness assembly requirement. The number of optical fibers (see, e.g., optical fibers 618, 718 as shown in FIGS. 10-11 and optical fibers 318, 418 as shown in FIGS. 5-7) within a particular buffer tube or ribbon may be adjusted to meet specific harness assembly requirements. In some embodiments the buffer tubes are generally constructed to maintain a circular shape, but in other embodiments, thin-walled buffer tubes may be used, which become oval-shaped during bending, allowing the optical fibers to reposition themselves along the neutral axis of the bend, thereby reducing stresses experienced by the optical fibers.

According to an exemplary embodiment, the optical fibers are glass optical fibers, such as silica waveguides, single-mode or multi-mode, each including a core within cladding. The buffer tubes may be polypropylene, polybutylene terephthalate (PBT), another thermoplastic or polymer, etc. The jacket may be formed from polyethylene, polyvinyl chloride (PVC), etc., and may include a nylon skin and be loaded with carbon black for ultra violet light resistance. Strength members may be formed from resin-bonded e-glass, resin-bonded aramid, solid steel, steel strand, or other materials. The optical fiber cable may include armor, such as corrugated steel tape armor within the jacket. The optical fiber cable may include water-blocking material, such as a filling compound, dry water-swellable materials (e.g., impregnated tape or thread), polymers, etc. Rip cords, binder yarns, and other materials, features, and components may also be included in the optical fiber cable.

The above-described optical fiber cables 310, 410, 610, 710 and manufacturing methods 810 are intended to lower production costs for manufacturing optical fiber cable assemblies as described herein by eliminating the material costs associated with relying on furcation tubes during the manufacturing process, as well as eliminating waste associated stripping off and scrapping long lengths of cable jacket and strength elements. Technology disclosed herein is further intended to reduce the time and labor need to manufacture embodiments of interconnect optical fiber cable assembly 118 (e.g., harness assemblies) disclosed herein by eliminating steps of pushing the optical fibers through furcation tubes. The technology still further increases productivity of manufacturing relative to conventional processes by reducing the occurrence of fiber breaks during assembly by removing the need to expose and handle long lengths of bare fiber during processing. The technology allows for multiple connector reworks (i.e., reattachment, replacement, substitution) as well as control of tight leg length tolerances by allowing for sliding of the modules axially through the jacket relative to one another. Lastly, the technology disclosed herein allows for longer-length harness assemblies by providing axially adjustable modules and removing the limiting requirement of pushing the optical fibers through the furcation tube.

The construction and arrangements of the optical fiber cable and assembly, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of manufacturing an optical fiber cable assembly, comprising steps of:
   attaching local connectors to optical fibers of legs of the optical fiber cable assembly, wherein the legs are formed from distal portions of modules that project from a distal end of a jacket of the optical fiber cable assembly;
   sliding the modules axially through the jacket relative to one another in order to change the length of the corresponding legs, thereby adjusting the length of the legs for a desired configuration of the optical fiber cable assembly;
   attaching a multi-fiber connector to optical fibers of the modules at the proximal end of the jacket; and
   attaching the multi-fiber connector to the strength element on one end of the jacket;
   attaching the furcation body to the strength element on the other end of the jacket; and
   tensioning a strength element extending through the jacket and fixing the strength element at ends of the jacket while not correspondingly tensioning the modules, such that when the jacket is stretched the strength element is tensioned before the modules and tensile loads experienced by the optical fiber cable assembly along the jacket are primarily borne by the strength element.

2. The method of claim 1, further comprising steps of:
   severing and removing excess length of the modules; and
   aligning proximal ends of the modules with the proximal end of the jacket.

* * * * *